June 7, 1960 N. FREEDMAN ET AL 2,939,918

SYSTEM FOR COMPRESSING BANDWIDTH

Filed Aug. 24, 1954 2 Sheets-Sheet 1

INVENTORS.
NATHAN FREEDMAN
KENNETH T. LARKIN
BY George Lipkin
Lee J. Huntzberger
ATTORNEYS June 7, 1960 N. FREEDMAN ET AL 2,939,918

SYSTEM FOR COMPRESSING BANDWIDTH

Filed Aug. 24, 1954 2 Sheets-Sheet 2

INVENTORS.
NATHAN FREEDMAN
KENNETH T. LARKIN
BY George Sipkin
Lee I. Huntzberger
ATTORNEYS United States Patent Office 2,939,918

Patented June 7, 1960

2,939,918

SYSTEM FOR COMPRESSING BANDWIDTH

Nathan Freedman, Auburndale, and Kenneth T. Larkin, Wayland, Mass., assignors, by mesne assignments, to the United States of America as represented by the Secretary of the Navy Filed Aug. 24, 1954, Ser. No. 451,991

7 Claims. (Cl. 179—15.55)

This invention concerns a method and a system for compressing bandwidth, and more particularly, it concerns a method and a system for compressing the intermediate frequency bandwidth necessary in wide-coverage receivers whose intermediate frequency bandwith is wider than is necessary for fidelity reasons alone.

This invention is particularly adapted for use in a radar beacon receiver. The wide bandwidth of a radar beacon receiver is made necessary by the fact that interrogating transmitters may scatter in frequency over a considerable region. This invention is adapted for use with any receiver which is required to listen in simultaneously on a wide band of frequencies for possible transmissions, although the signals themselves only occupy a narrow spectrum bandwidth. There is no inherent frequency limitation in this system; however, its specific advantages are of most use in high-frequency, very wide-band receivers.

An object of this invention is to provide a method for compressing bandwidth.

A further object is to provide a method for compressing intermediate frequency bandwidth in a wide-coverage receiver to slightly more than one-half its original value.

A further object is to provide a system for compressing bandwidth.

A further object is to provide a system for compressing intermediate frequency bandwidth in a wide-coverage receiver to slightly more than one-half its original value.

Figure 1:
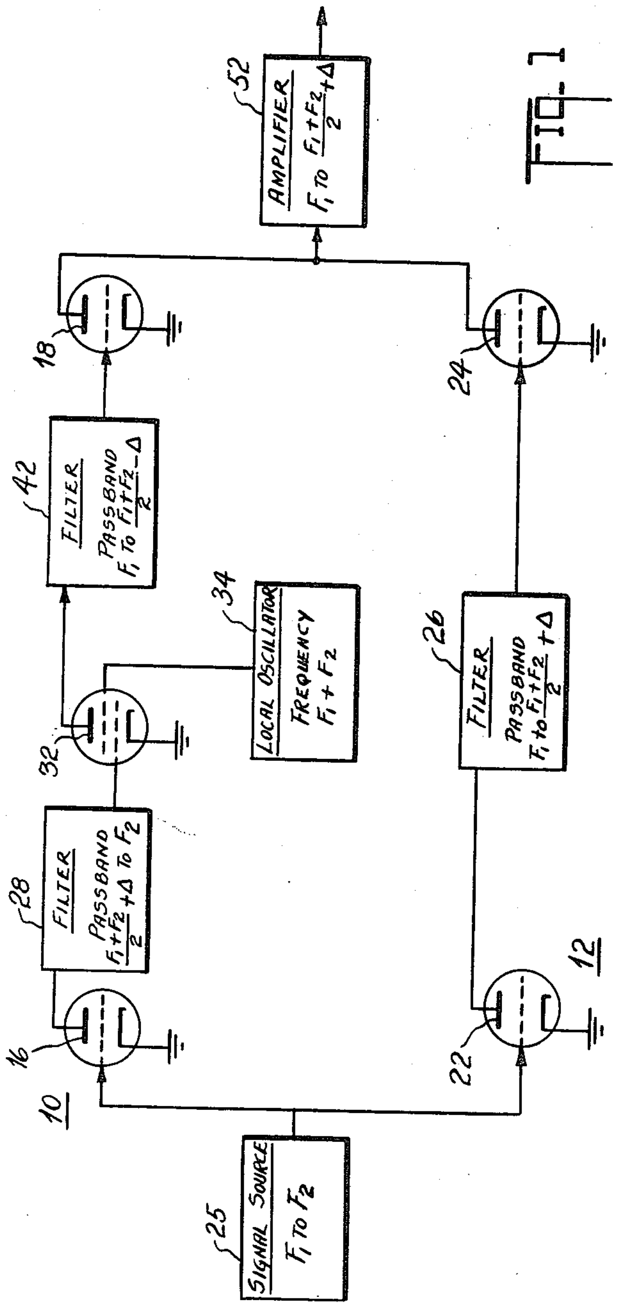
Figure 4:
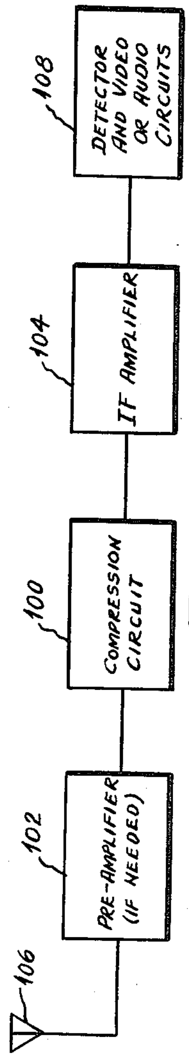
Figure 2:
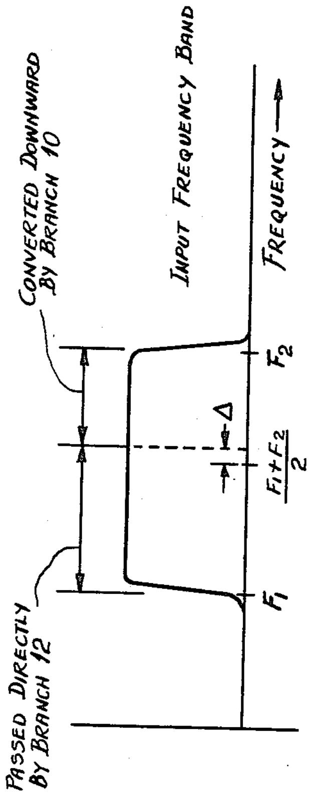
Figure 3:
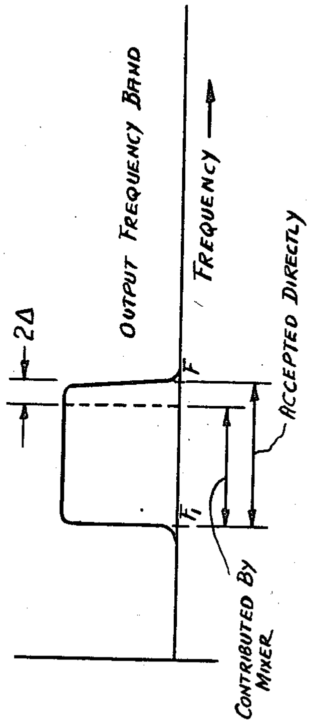

Other objects and many of the attendant advantages of this invention will be readily appreciated as the same becomes better understood by reference to the following detailed description when considered in connection with the accompanying drawings wherein:

Fig. 1 is a schematic wiring diagram of a preferred embodiment of this invention with most components shown in block form, Fig. 2 shows a graphical plot of the bandwidth input to the circuit of Fig. 1 and its division by the branches of Fig. 1, Fig. 3 is a graphical plot of the output frequency band of the circuit of Fig. 1, and Fig. 4 is a block diagram of a receiver including this invention.

The embodiment of the invention shown in Fig. 1 includes a pair of isolated circuit branches 10 and 12. The circuit branch 10 includes a decoupling vacuum tube 16 at its input end and a decoupling vacuum tube 18 at its output end. The circuit branch 12 includes a decoupling vacuum tube 22 at its input end and a decoupling vacuum tube 24 at its output end. The decoupling vacuum tubes of the circuit branches 10 and 12 serve to decouple the circuit branches from each other to prevent interaction between the components in the circuit branches. The input ends of circuit branches 10 and 12 are adapted to be connected to a signal source 25; signal source 25 provides a narrow spectrum signal anywhere in a selected, very wide, acceptance frequency band extending from frequency $F_1$ to frequency $F_2$ (Fig. 2). The circuit branch 12 includes a filter 26. The filter 26 is characterized by a passband which includes the lower half of the bandwidth accepted from signal source 25 plus a small increment (Δ) of the uper half. The passband of filter 26 extends from frequency $F_1$ to $$\frac{F_1+F_2}{2}+\Delta$$

The filter 26 is connected directly between the output end of decoupling vacuum tube 22 and the input end of decoupling vacuum tube 24.

The circuit branch 10 includes a filter 28. The filter 28 is characterized by a passband in the acceptance band of the circuit which permits passage of the frequencies from signal source 25 not passed by filter 26. The passband of filter 28 is equal to $$\frac{F_1+F_2}{2}+\Delta$$

to frequency $F_2$. Circuit branch 10 further includes a mixer stage 32. A local oscillator 34 is connected to one of the grids of the mixer stage 32. The output end of filter 28 is connected to another of the grids of mixer stage 32. The frequency generated by the local oscillator 34 is equal to the sum of the frequencies defining the limits of the acceptance band of signals derived from signal source 25. The mixer stage 32 heterodynes the signals from filter 28 and from local oscillator 34. A third filter 42 is connected in the plate circuit of the mixer stage 32. The filter 42 is characterized by a passband which accepts the difference beat frequency from mixer stage 32. The bandpass of filter 42 extends from frequency $F_1$ to $$\frac{F_1+F_2}{2}-\Delta$$

Filter 28 operates with a sharp low frequency cutoff. Filter 42 operates with a sharp high frequency cutoff. The output end of filter 42 is connected to the input end of decoupling vacuum tube 18. Decoupling by tubes is desirable at least at one end so that there can be no undesirable effects due to feedback around the loop comprising the two circuit branches 10 and 12.

An amplifier 52 is connected to the output ends of circuit branches 10 and 12. The passband of amplifier 52 is only slightly more than one-half the acceptance bandwidth of the branches 10 and 12 to signals from source 25. The outputs from circuit branches 10 and 12 are combined and amplified by amplifier 52. The output of the amplifier is an amplified signal, which may be detected, just as in a conventional system. If desired, more complex filters may be substituted to afford the isolation above afforded by the isolation vacuum tubes 16, 18, 22, and 24, making the latter unnecessary. In other words, more involved band-dividing filters may be designed which split up an acceptance band in two sections while maintaining a constant input impedance. These are similar to the cross-over networks used in high-and-low frequency loudspeaker installations. The use of these might eliminate the necessity for the input pair of vacuum tubes. There is shown in Fig. 4 in block form, the relationship of this compression circuit to the remainder of a receiver. The compression circuit 100 in accordance with this invention is connected between a pre-amplifier 102, if needed, and an IF amplifier 104. The pre-amplifier 102 is connected to antenna 106. The IF amplifier is connected to detector and video or audio circuits 108.

The operation of the circuit is best illustrated by a numerical example. An inspection of the quantities involved in this numerical example shows that the mixing action in the circuit branch 10 converts the upper half of the circuit acceptance band to signals from source 25 into the lower half of the band from source 25. To illustrate, let it be assumed that the acceptance frequency band extends from 10 to 90 megacycles. Further, let it be assumed that Δ is 5 megacycles. Therefore, the passband of filter 26 extends from 10 to 55 megacycles. The passband of filter 28 extends from 55 to 90 megacycles. The local oscillator frequency is equal to 10+90 or 100 megacycles. The difference generated in the mixer stage 32 is equal to 100−(55 to 90) or 10 to 45 megacycles. As a result, the 10 to 90 acceptance frequency band from source 25 is fitted into a band of 10 to 55 megacycles. If the frequency increment Δ were not employed in the filter design, the acceptance band of signals from source 25 would be divided exactly in half. The lower half of the band would go through circuit branch 12 and the upper half of the band would go into the mixer stage 32 in circuit branch 10. Under this condition of operation a frequency at or close to the center of the input band would arrive at the output of circuit branches 10 and 12 since filter characteristics cannot be made infinitely sharp. The output of circuit branches 10 and 12 would then contain frequency components which are very close together. Frequency components which would be close together would beat in the output detector to produce undesirable low frequency modulation on the desired signal. Therefore, by staggering the branch acceptance bands by the increment Δ the acceptance band center area is passed only by branch 12, thereby precluding undesirable low frequency modulation on the desired signal due to the beat effect in the output detector. The magnitude of Δ selected depends upon the excellence of the filters; it also depends upon the harmful effects of a low frequency beat in using the receiver.

The spurious low-frequency modulation may be reduced to whatever extent necessary by making Δ large enough. How large it needs to be depends on the width of the signal spectrum, and the sharpness of the filter characteristics.

The output frequency response will be flat only if the gain through both circuit branches 10 and 12 are equal. This may conveniently be arranged by setting the gain of a tube in the circuit. If the gain through all filters is unity, it follows that the mixer conversion gain is unity for flat frequency response.

The bandwidth is compressed to make possible amplification over a wide band using a reasonable number of tubes. Gain-bandwidth considerations would force use of a very large number of tubes in a conventional IF design of 80 megacycles bandwidth, for example. With half the bandwidth, the number of tubes is cut by much more than half.

The system described may be cascaded for further bandwidth narrowing. However, too much cascading generally lowers receiver sensitivity.

Obviously many modifications and variations of the present invention are possible in the light of the above teachings. It is therefore to be understood that within the scope of the appended claims the invention may be practiced otherwise than as specifically described.

We claim:

1. A bandwidth compression circuit for a predetermined frequency band comprising; a first circuit branch, a second circuit branch, means for connecting said circuit branches in parallel and for isolating said circuit branches against interaction with one another; said first circuit branch including a first filter characterized by a passband corresponding to the lower part of the predetermined frequency band, the passband differing from one-half the predetermined frequency band by an amount delta; said second circuit branch including a second filter characterized by a passband equal to the difference between the predetermined frequency band and the passband of said first filter, both of said filters manifesting sharp cutoff at the separation frequency, a local oscillator for generating a frequency which is equal to the sum of the frequencies defining the limits of the predetermined frequency band, a mixer stage connected to said second filter and to said local oscillator, and a third filter connected to the output of said mixer stage and characterized by a passband for passing only lower sideband frequencies from said mixer stage; the amount delta being no larger than is necessary for preventing harmful low frequency modulation of the desired signal.

2. A bandwidth compression circuit for a predetermined frequency acceptance band comprising a signal source of said band, an amplifier, parallel circuits connecting said source to said amplifier, each of said circuits including therein two decoupling stages one near the beginning and one near the end thereof, one of said circuits between its said stages having a filter passing only signals of frequencies in the range of a lower part of at least half of said frequency band plus an increment equal to a small fraction of the entire frequency range of said acceptance band, and the other of said circuits having sequentially in series therein, beginning immediately after its said first decoupling stage, a filter passing only signal frequencies in the range from said lower part of said band plus said increment to the upper limit of said band, then a mixer tube, and then a filter passing only signal frequencies in the range of said lower part minus said increment, and an oscillator connected to said mixer tube and heterodyning the signal frequencies passing between the filters in said other circuit to a range within the said lower part of said acceptance band.

3. The circuit as set forth in claim 2 wherein said lower part is substantially half of the entire acceptance frequency band.

4. A bandwidth compression circuit for a predetermined frequency acceptance band comprising a signal source of said band, an amplifier, parallel circuits connecting said source to said amplifier, one of said circuits having a filter passing only signals of frequencies in the range of the lowest frequency in the band to at least half of said frequency acceptance band plus an increment equal to a small fraction of the entire frequency range of said acceptance band, and the other of said circuits having sequentially in series therein first a filter passing only signal frequencies in the range from said half of said acceptance band plus said increment to the upper limit of said band, and then a filter passing only signal frequencies in the range from the lowest frequency in said acceptance band to said about half of said acceptance band minus said increment, and means connected to said other of said parallel circuits between said filters in that parallel circuit, for heterodyning the signal frequencies passing the first filter in that said other parallel circuit with a frequency equal to the sum of about the lowest and highest limits of said acceptance band to a range within the said lower part of said acceptance band.

5. A bandwidth compression circuit for a predetermined frequency acceptance band comprising a signal source of said band, an amplifier, parallel circuits connecting said source to said amplifier, one of said circuits having a filter passing only signals of frequencies in the range of a lower part of at least half of said frequency acceptance band plus an increment equal to a small fraction of the entire frequency range of said acceptance band, and the other of said circuits having sequentially in series therein first a filter passing only signal frequencies in the range from said lower part of said band plus said increment to the upper limit of said band and then a filter passing only signal frequencies in the range of said lower part minus said increment, and an oscillator connected to said other of said parallel circuits for heterodyning the signal frequencies passing the first filter in that said other parallel circuit with a frequency equal to the sum of the limit frequencies of said acceptance band.

6. The circuit as set forth in claim 4, and means associated with the beginning and end of each of said parallel circuits for decoupling them.

7. The circuit as set forth in claim 5, and means associated with each of said parallel circuits for decoupling them.

References Cited in the file of this patent

UNITED STATES PATENTS

| | | |
|---|---|---|
| 2,407,213 | Tunick | Sept. 3, 1946 |
| 2,536,664 | Sinnett et al. | Jan. 2, 1951 |
| 2,686,831 | Dome | Aug. 17, 1954 |
| 2,766,325 | Di Toro | Oct. 9, 1956 |